United States Patent [19]

Roberts

[11] Patent Number: 6,072,614

[45] Date of Patent: Jun. 6, 2000

[54] MONITORING INDUCED COUNTERPROPAGATING SIGNALS IN OPTICAL COMMUNICATIONS SYSTEMS

[75] Inventor: Kim Byron Roberts, Welwyn Garden, United Kingdom

[73] Assignee: Nortel Networks Corporation, Montreal, Canada

[21] Appl. No.: 08/916,168

[22] Filed: Aug. 21, 1997

[51] Int. Cl.[7] .................................................. H04B 10/16
[52] U.S. Cl. ........................ 359/177; 359/110; 359/173; 359/334
[58] Field of Search ..................................... 359/110, 155, 359/161, 173, 177, 187, 334, 337, 349; 356/73.1

[56] References Cited

U.S. PATENT DOCUMENTS

| | | | |
|---|---|---|---|
| 4,560,246 | 12/1985 | Cotter | 350/96.16 |
| 4,911,515 | 3/1990 | So et al. | 359/161 |
| 4,997,277 | 3/1991 | Horiguchi | 356/73.1 |
| 5,285,305 | 2/1994 | Cohen et al. | 359/110 |
| 5,329,396 | 7/1994 | Fishman | 359/173 |
| 5,416,623 | 5/1995 | Dawson et al. | 359/110 |
| 5,513,029 | 4/1996 | Roberts | 359/177 |
| 5,847,856 | 12/1998 | Imai | 359/180 |
| 5,859,725 | 1/1999 | Sugiya et al. | 359/341 |
| 5,912,760 | 10/1999 | Sugiya | 359/341 |
| 5,963,361 | 10/1999 | Taylor et al. | 359/337 |

FOREIGN PATENT DOCUMENTS

| | | |
|---|---|---|
| 0499171 A1 | 2/1992 | European Pat. Off. . |
| 0652651 A1 | 10/1994 | European Pat. Off. . |
| 2303753 | 9/1991 | United Kingdom . |
| 2292495 | 2/1996 | United Kingdom . |
| 2316562 | 12/1996 | United Kingdom . |

*Primary Examiner*—Leslie Pascal
*Attorney, Agent, or Firm*—Lee, Mann, Smith, McWilliams, Sweeney & Ohlson

[57] ABSTRACT

An optical communications system has a control system for controlling the transmission of signals between system elements via waveguides. The occurrence of counterpropagation occurring due to scattering or other bulk properties of the waveguides is monitored under the control of the control system at selected system elements such as bidirectional optical amplifiers. A reverse signal found to be consistent with a scattering process is analysed in terms of a power distribution as a function of delay relative to transmission of an outgoing signal and any effects due to discrete scattering events are identified and removed from the power distribution data. The revised data is used to quantify the effects of the scattering process. Stimulated Brillouin scattering is identified by analysis of backscatter in terms of wavelength of selected signals in a wavelength multiplexed transmission and the control system responds by regulating operating parameters of the system such as the degree of stimulated Brillouin scattering suppression and transmission power. The system is thereby able to automatically detect the occurrence of faults associated with bulk properties of the waveguides of the system and initiate appropriate remedial action or raise alarms.

34 Claims, 7 Drawing Sheets

Fig 4 STEP 2

Fig 5A

STEP 2

STEP 3

Fig 5D

Fig 6 STEP 4

Fig 7

STEP 4

Fig 8

STEP 5

Fig 9

STEP 6

MONITORING INDUCED COUNTERPROPAGATING SIGNALS IN OPTICAL COMMUNICATIONS SYSTEMS

FIELD OF THE INVENTION

This invention relates to the monitoring of induced counterpropagating signals such as stimulated Brillouin scattering in optical telecommunications systems and the control of such systems in the presence of such induced signals.

BACKGROUND TO THE INVENTION

Optical transmission systems for telecommunications typically comprise a number of system elements connected by waveguides in the form of optical fibres, there being typically a number of bi-directional line amplifiers at spaced locations between each transmitter and receiver. Such amplifiers are necessary when long distance communication is required in order to compensate for the power loss associated with transmission through the fibres.

One of the main factors limiting the maximum power which can be launched into a fibre is the effect of stimulated Brillouin scattering, the effects of which are characterised by a counterpropagated signal which is down shifted in frequency by about 11 GHz for silica glass fibres, the onset of scattering being observed at a threshold power which can be as low as 2 mW to 3 mW.

SBS (stimulated Brillouin scattering) can be suppressed by low frequency amplitude modulation (dither) of the transmission as described in U.S. Pat. No. 5,329,396 so that the peak launched power level can be increased. In effect, this modulation enables the power spectral density of the transmission to be less than the threshold of onset of SBS. A similar effect is achieved by time varying the phase angle of transmission light waves as disclosed in U.S. Pat. No. 4,560,246. There is however some degree of degradation to the transmitted signal associated with such methods of SBS suppression so that the degree of suppression utilised is ideally kept to a minimum.

Other forms of induced counterpropagating process include Rayleigh scattering and Raman scattering. In referring to induced counterpropagating processes in the context of the present application, the intended meaning encompasses the above mentioned and similar effects associated with wavelength dependent and/or non linear sources of counterpropagating signal, generally associated with bulk properties of the waveguide material, and specifically excluding reflection from fibre defects, couplings or other discontinuities in the waveguides or components of the system.

U.S. Pat. No. 4,997,277 includes a discussion of the detection of Rayleigh scattering as a means of investigating the distributed properties of an optical fibre and the use of Brillouin light amplification to investigate optical fibre properties.

It is also known from U.S. Pat. No. 5,513,029 to provide an optical transmission system in which an optical signal is modulated with a low frequency dither signal enabling individual signal and noise components in a wavelength multiplexed system to be measured at monitoring locations in the system and wherein optical amplifiers of the system are controlled so as to be responsive to the monitored data to control the optical gain profile of the optical amplifier.

SUMMARY OF THE INVENTION

It is an object of the present invention to provide in an optical transmission system a method and apparatus for determining the presence of induced counterpropagated signals.

It is a further object of the present invention to provide in an optical transmission system a method and apparatus of controlling an element of the system in dependence upon the determination of whether an induced counterpropagated signal is present.

It is a further object of the present invention to provide in an optical transmission system a method and apparatus of controlling the amount of stimulated Brillouin scattering suppression in dependence upon the result of determining the presence of induced counterpropagated signals.

According to the present invention there is disclosed a method of transmitting signals between a plurality of system elements connected by waveguides in an optical communications system, the method comprising the steps of:

(a) monitoring at a selected system element a transmission via a selected waveguide of a selected outgoing signal in a selected forward direction;

(b) monitoring incoming signals received via said waveguide at the selected system element in a reverse direction which is opposite to the forward direction;

(c) detecting in the incoming signals a reverse signal constituted by a component of the outgoing signal propagated in the reverse direction;

(d) determining whether the reverse signal has characteristics consistent with the occurrence of an induced counterpropagation process; and (e) controlling the transmission of signals in said system in accordance with the results of said determining step.

Preferably the determining step determines whether the reverse signal has characteristics consistent with the induced counterpropagating process comprising stimulated Brillouin scattering associated with bulk properties of the waveguide. Preferably a power distribution of the reverse signal is measured as a function of delay relative to transmission of the outgoing signal in the forward direction. Such a power distribution, typically in the form of a reflection array, will contain diffuse features if the reverse signal originates from an induced counterpropagation process distributed along the length of the waveguide and discrete features in the form of peaks in the power distribution will correspond to discrete points of reflection, for example resulting from discontinuities in the waveguide or connectors and the like. The above use of the term "diffuse" is intended to indicate a power distribution which varies smoothly as a function of delay, relative to the sharply varying power distribution features associated with discrete reflections.

Analysis of the power distribution of the reverse signal thereby allows the presence of a scattering process to be deduced. Discrete features corresponding to discrete reflections may be removed from the power distribution data and the revised power distribution data utilized in further evaluation. The further evaluation may include a best fit calculation applied to the revised power distribution data to determine best fit coefficients of a predetermined functional relationship representative of the effects of a scattering process.

An estimate of the component of power of the reverse signal due to scattering may be calculated from the above best fit calculation and compared with a threshold to determine whether a fault condition exists.

The shape of the power distribution data, as revealed in the best fit calculation, provides a basis for identifying the source of the reverse power. An exponential decay for example is characteristic of scattering processes.

The determining step may include further stages of analysing the reverse power including an analysis of wavelength multiplexed components in the reverse power to reveal the wavelength dependence of scattering. In a typical scenario, a single component in a wavelength multiplexed transmission will largely be responsible for the fault condition in which stimulated Brillouin scattering at one wavelength results in increased reverse power relative to the reverse power of the remaining components. The reverse power for the remaining components will follow the wavelength dependence of Rayleigh scattering ($P=k/\lambda^4$). Stimulated Brillouin scattering may be quantitively measured by estimating the amount of Rayleigh scattering of the single component by interpolation of data for the remaining components and subtracting the estimate of Rayleigh scattering from the total reverse power measured for the single component responsible for stimulated Brillouin scattering.

The system may be controlled according to the measure of stimulated Brillouin scattering by adjusting the transmitted power, re-routing data traffic, or adjusting the degree of stimulated Brillouin suppression applied to the selected signal at which the fault condition is determined to exist.

Preferably the above steps are performed under the control of a control system without operator intervention.

Preferred embodiments of the present invention will now be disclosed by way of example only and with reference to the accompanying drawings.

BRIEF DESCRIPTION OF THE DRAWINGS

FIG. 5 is a graphical representation of,

Graph A—measured reverse power including discrete features corresponding to discrete reflections, Graph B—measured reverse power after removal of the discrete features (step 2), Graph C—the result of curve fitting (step 3), Graph D—the range of delay characteristics consistent with scattering;

DETAILED DESCRIPTION OF EMBODIMENTS

Figure 1:
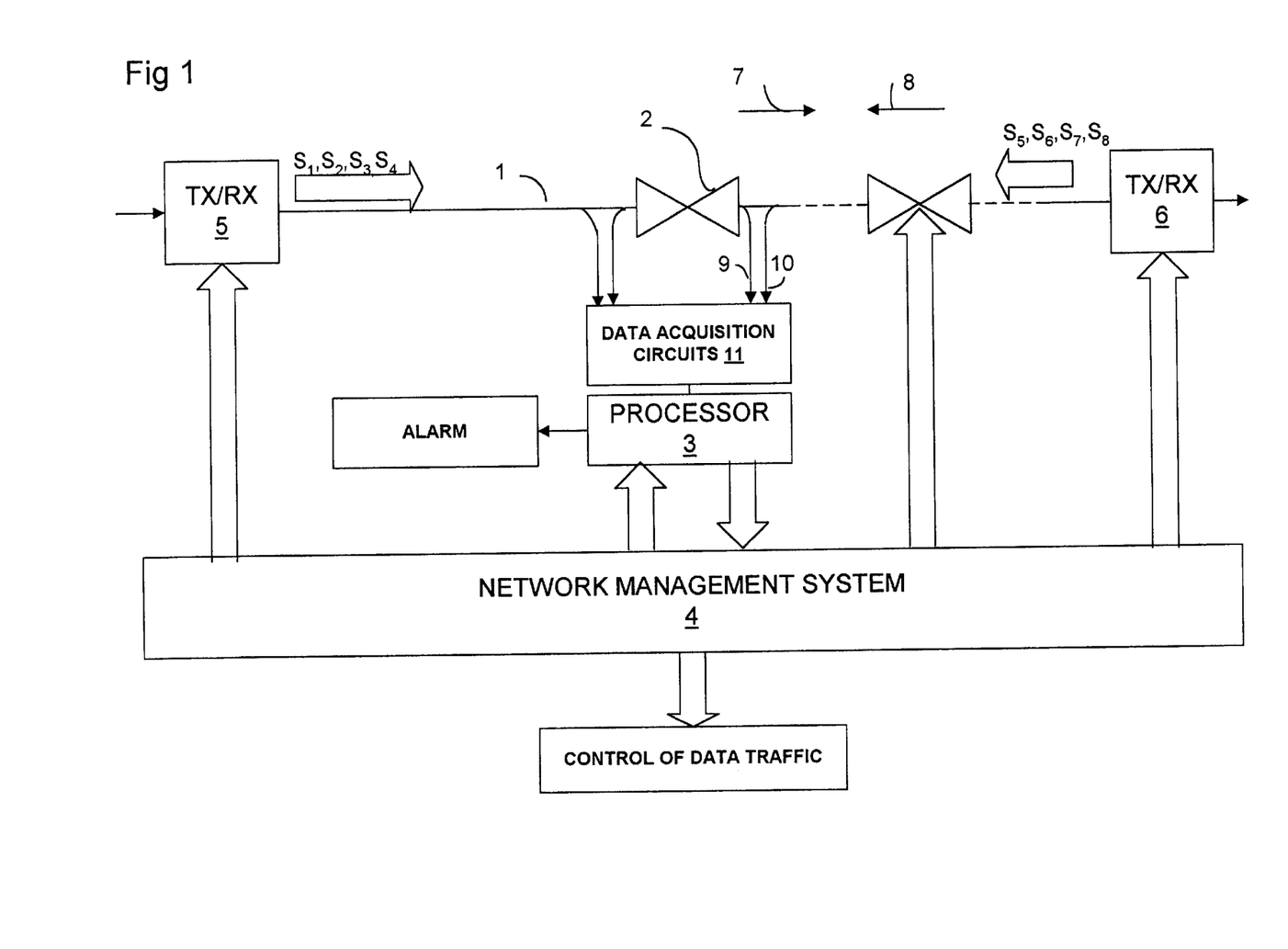
FIG. 1 is a schematic diagram of an optical transmission system in accordance with the present invention.

FIG. 1 illustrates schematically part of an optical transmission system in which elements of the system are connected by waveguides 1 in the form of optical fibres for the bi-directional transmission of optical signals. The optical signals are boosted periodically by bi-directional line amplifiers such as the amplifier 2 which is operated under the local control of a processor 3.

In the following examples, the amplifier 2 is selected as a system element at which signal monitoring is undertaken to allow determination of system faults.

Overall control of the optical transmission system is effected by a network management system 4 which maintains overall control of the routing of data traffic and the function of the system elements including amplifier 2. In the example of FIG. 1, a single fibre waveguide 1 carries four wavelength multiplexed signals $S_1$, $S_2$, $S_3$, $S_4$ from a first transmitting and receiving element 5 to a second transmitting and receiving element 6. The second transmitting and receiving element 6 transmits four further wavelength multiplexed signals $S_5$, $S_6$, $S_7$, $S_8$ in the opposite direction via the waveguide 1 to the first transmitting and receiving element 5. The wavelengths of signals $S_1$ to $S_8$ are mutually different.

The processor 3 is programmed to periodically carry out a procedure to monitor the presence of induced counter-propagating signals and to take appropriate remedial action. In the following description, a procedure is described which is tailored specifically to detect and quantify the effects of SBS.

Transmission in a particular direction is selected and designated in FIG. 1 as a forward direction 7 (towards the second transmitting and receiving element), any counter-propagating signal therefore being received at the amplifier 2 by propagation in a reverse direction 8.

The amplifier 2 is provided with a conventional coupling arrangement which outputs first and second tap signals 9 and 10 which are tapped from the amplified forward direction transmission and the reverse direction transmission respectively. The tap signals 9 and 10 are detected by data acquisition circuits 11 which output respective digitised data samples representing forward and reverse power to the processor 3.

Figure 2:
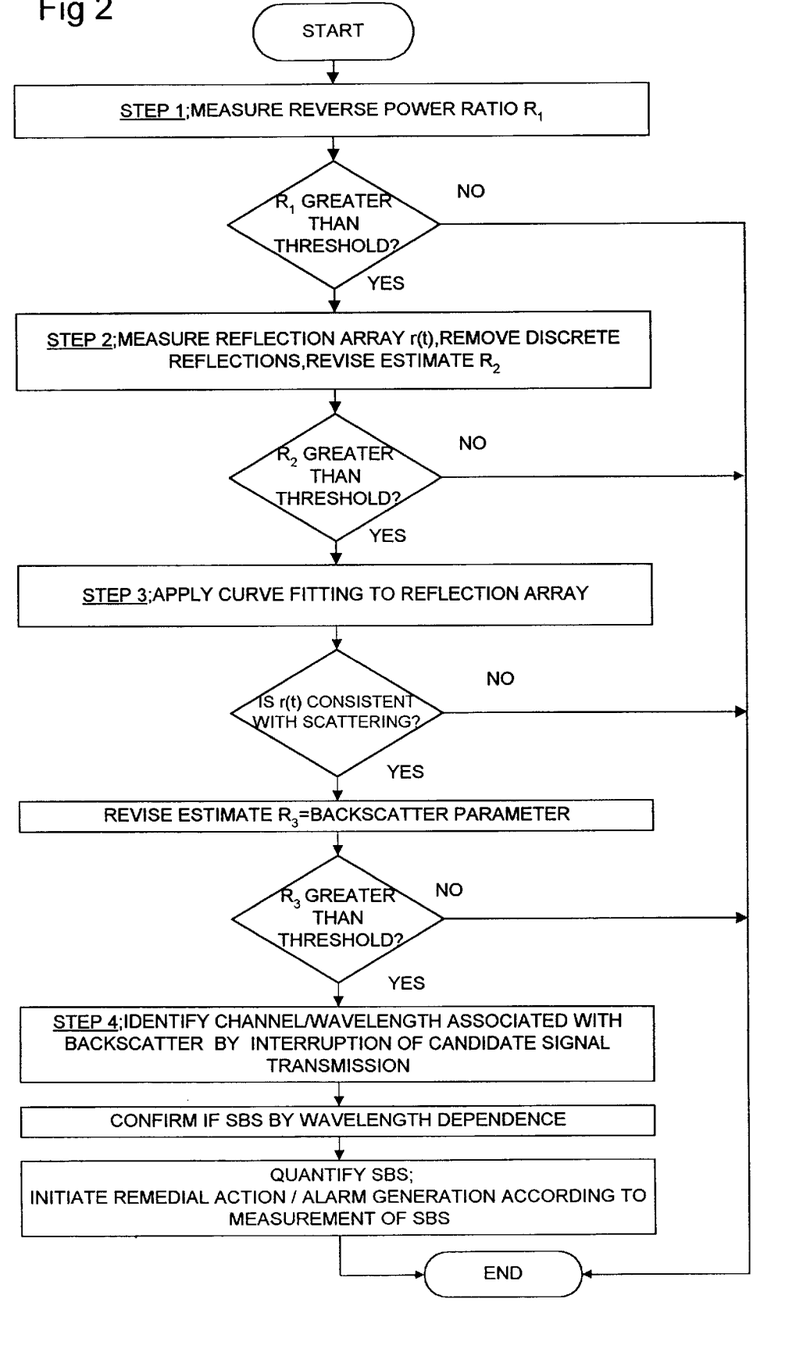
FIG. 2 is a flowchart illustrating overall operation of a system in accordance with the present invention.

The series of steps implemented under the control of the processor 3 and the network management system 4 will now be described, referring to Step 1 to Step 6 as follows. The overall sequence of steps is summarised schematically in the flowchart of FIG. 2.

Step 1; Measurement of Total Reverse Direction Power

Figure 3:
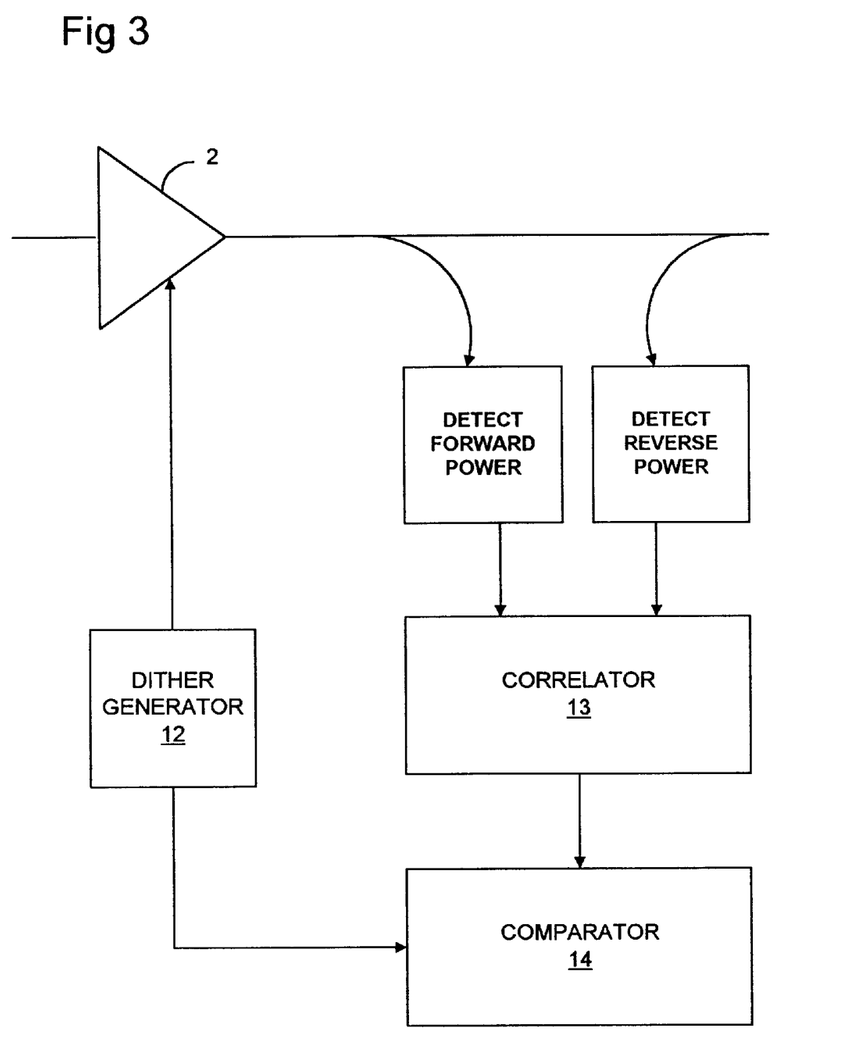
FIG. 3 is a schematic diagram of apparatus for measuring reverse power (step 1)

In Step 1, the total optical power transmitted in the reverse direction as a result of reflection of the amplified signals $S_1$, $S_2$, $S_3$, $S_4$ and counterpropagation induced by the amplified signals is measured. In order to distinguish such reverse power from the total. transmission signals in the reverse direction $S_5$, $S_6$, $S_7$, $S_8$, a low frequency dither is applied to the amplified forward direction transmission by applying a square wave modulation to the bias voltage of the amplifier 2 by means of a dither generator 12 as illustrated in FIG. 3. This method of measurement is disclosed in our copending application U.S. Ser. No. 08/588,176, filed Jan. 18th, 1996, the contents of which are incorporated herein by reference. The dither frequency is in the range 1 Hz to 100 Hz which is a sufficiently low frequency for the modulation of the reverse power to remain correlated to the modulation of the forward direction power. The processor 3 calculates the ratio $R_1$ between the measured reverse and forward direction powers and compares the ratio with a threshold value of −30 dB, this process being represented in FIG. 3 schematically by correlator 13 and comparator 14. If the threshold is exceeded, it is concluded that unsatisfactory operation merits further investigation, thereby proceeding to step 2.

Figure 4:
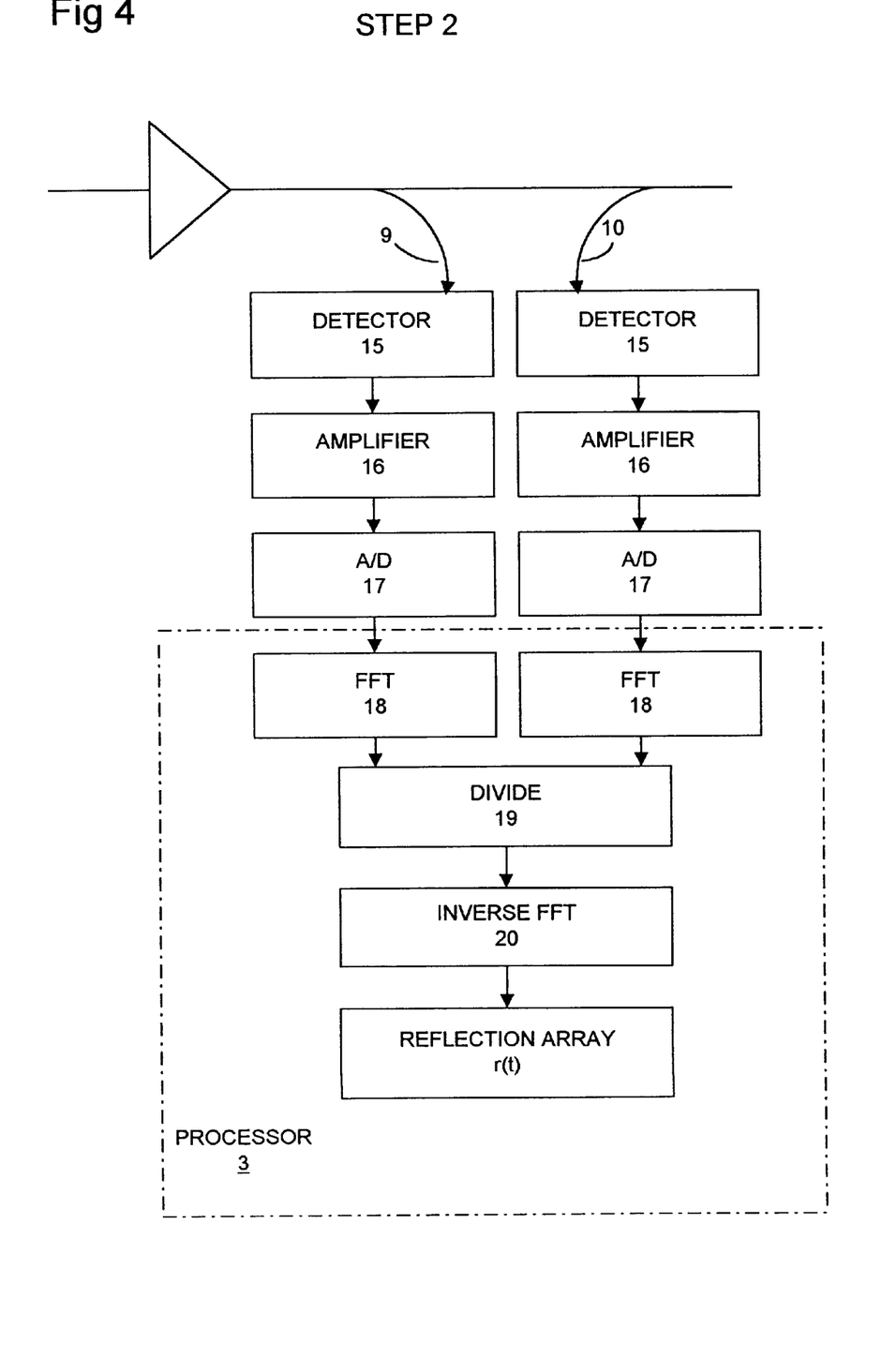
FIG. 4 is a schematic diagram of apparatus for measuring the variation of reverse power with delay (step 2)
Figure 5A:
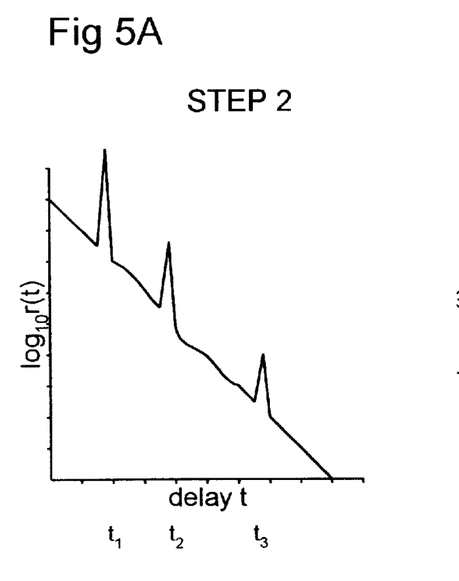
Figure 5B:
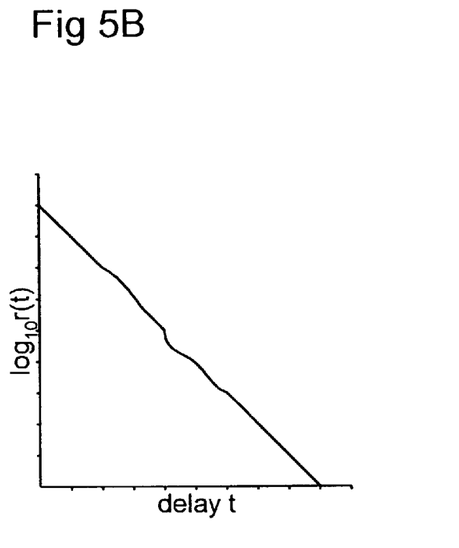
Figure 5C:
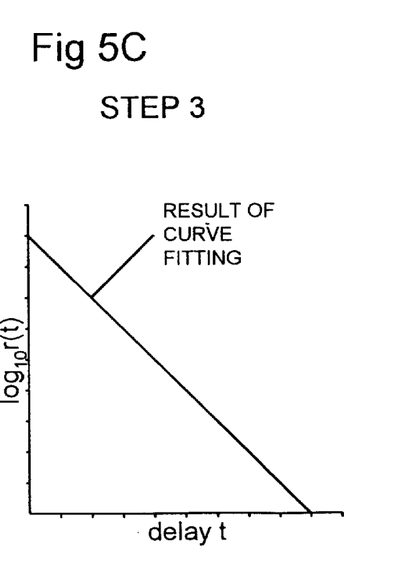
Figure 5D:
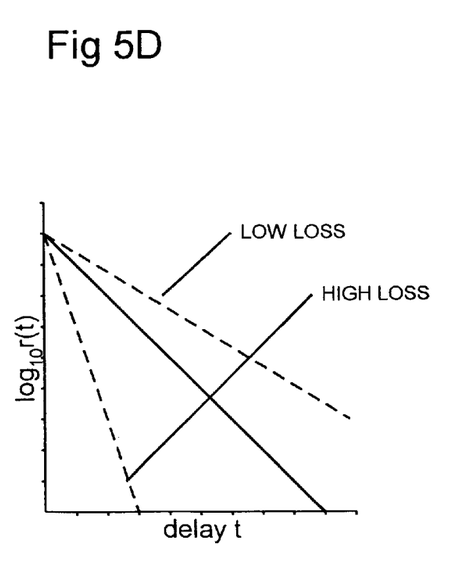

Step 2; Measurement of Reverse Power as a Function of Delay and Removal of Discrete Features The low frequency dither of the amplifier 2 used in step 1 is discontinued and in step 2 the forward direction transmission of data is utilised as a test signal in measuring the amount of reverse power as a function of delay. The first and second tap signals 9 and 10 which are representative of the forward and reverse power are sampled at a rate of 10 MHz as shown schematically in FIG. 4 by means of detectors 15, bandwidth limited amplifiers 16 and analogue to digital converters 17 and the resulting data analysed by the processor 3 using FFT (Fast Fourier Transform) techniques. The low frequency spectral components of the forward direction signals $S_1$, $S_2$, $S_3$, $S_4$ provide a signature which is detected in the second tap signal 10 by correlating the second tap signal 10 with a delayed version of the first tap signal 9. This process is illustrated schematically in FIG. 4 by function blocks within processor 3 comprising an FFT step 18 of forming FFT (fast Fourier transforms) for each of the respective first and second tap signal data inputs, a dividing step 19 of dividing the results of the FFT step and an inverse FFT step 20 of forming an inverse FFT of the results of division. The resulting data r(t), referred to hereafter as a reflection array, represents the distribution of reverse power a function of delay t, the delay being defined as the elapsed time between transmission of a signal by the amplifier in the forward direction and receiving at the amplifier the same signal propagated in the reverse direction.

The above method of obtaining a reflection array is disclosed in our copending application U.S. Ser. No. 08/793, 629 filed Feb. 18th, 1997, the contents of which are incorporated herein by reference. (U.S. Ser. No. 08/793,269 is derived from PCT/GB95/01918 and correspondingly published as GB-A-2292495).

Specifically, r(t) represents the proportion of transmitted power detected as reverse power per unit of delay so that the total reverse power is proportional to the area under a graph of r(t) against t.

FIG. 5 graph A illustrates graphically a typical reflection array represented as $\log_{10} r(t)$ against delay t. The graphical form is approximately a straight line, corresponding to an exponential decay, with a number of sharp peaks corresponding to discrete reflections at values of delay $t_1$, $t_2$ and $t_3$. The contribution to r(t) made by discrete reflections is revealed by the peaks in the reflection array and the processor 3 smooths the data using known algorithms by identifying and removing the peaks to provide the curve shown at graph B.

A revised estimate $R_2$ of the ratio between reverse and forward power is then calculated by taking the integral under the curve of graph B and the resulting ratio $R_2$ is compared with a threshold value of −30 dB. If this threshold is exceeded, it is concluded that unsatisfactory operation merits further investigation, thereby proceeding to step 3.

Step 3; Apply Best Fit Calculation to Reflector Array, Measure Rate of Decay and Obtain Improved Estimate of Backscatter Parameter The processor then applies a best fit algorithm to the reflection array data r(t) assuming that r(t) can be defined by a function of the form:

$$r(t) = A \cdot 10^{-\alpha t} \qquad \text{Equation 1}$$

where A is the initial value of reverse power and $\alpha$ is a measure of the decay of reverse power resulting from a signal impulse. The function of equation 1 is consistent with the reverse power being due to a scattering process, for values of $\alpha$ defined below. The value of $\alpha$ corresponds to the slope of the logarithmic graphical representation of FIG. 5. In graph C the result of the best fit calculation is shown as a straight line. The value of $\alpha$ obtained by the best fit calculation is compared with maximum and minimum values $\alpha_{max}$ and $\alpha_{min}$ which represent the limits of $\alpha$ for which the result is judged to be consistent with the decay in r(t) being due to a scattering process. $\alpha_{max}$ corresponds to a highly lossy optical fibre whereas $\alpha_{min}$ corresponds to an extremely low loss fibre. Typical values of $\alpha_{min}$ and $\alpha_{max}$ are 7,200 and 24,000 respectively, corresponding to the high loss and low loss limits shown in graph D.

If $\alpha$ falls outside of this range, the processor 3 initiates the acquisition of further data, repeating the preceding steps to obtain an improved level of confidence in the measurement.

If a value of $\alpha$ within the above limits is obtained, the processor proceeds on the assumption that scattering requires further analysis.

The total reverse power is then recalculated on the basis of the coefficients A and $\alpha$ obtained as the best fit calculation results, the new estimate of measured reverse power being the integral under the graph C of FIG. 5 and given by the expression:

$$R_3 = A \div \alpha \qquad \text{Equation 2}$$

$R_3$ is a backscatter parameter which represents the ratio between measured reverse cattering power and the forward power.

The processor 3 compares the value of $R_3$ with a threshold value of −30 dB and, if the threshold is exceeded, it is concluded that unsatisfactory operation merits further investigation, thereby proceeding to step 4.

Figure 6:
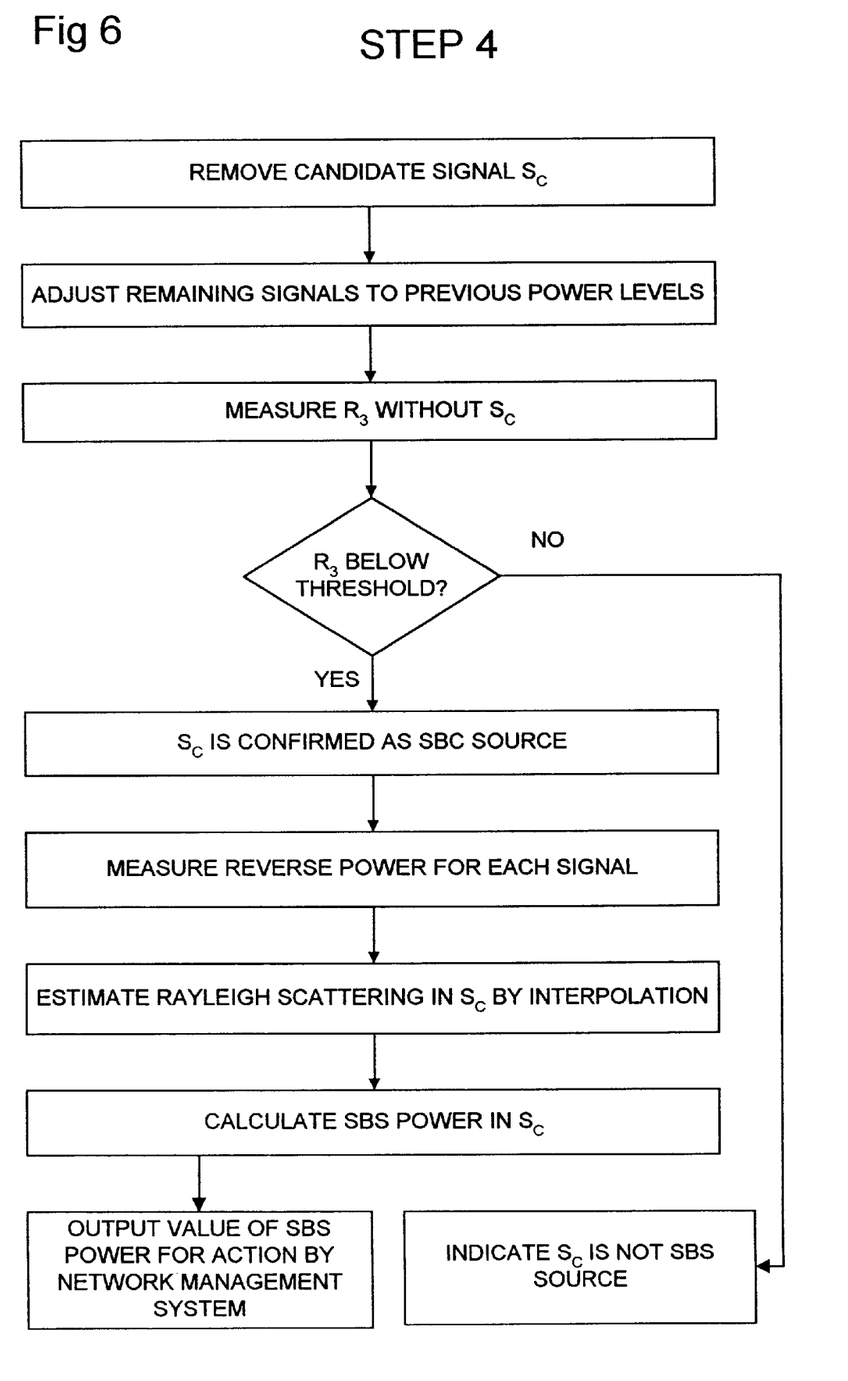
FIG. 6 is a schematic flowchart illustrating the identification of SBS and quantatively determining SBS power (step 4)

Step 4; Measurement of Wavelength Dependence to Confirm SBS Present, Quantify SBS and Initiate Remedial Action A candidate signal $S_c$ is selected from forward transmission signals $S_1$ to $S_4$ as being suspected of being responsible for the induced SBS. The first transmitting and receiving element 5 is instructed via the network management system to fade out the candidate signal $S_c$ while controlling the gain of the amplifier 2 such that the transmitted power levels for each of the remaining signals $S_i$ remain unchanged. Selection of the candidate signal will generally be made by the network management system based on the detection of bit errors in data received via that particular signal. The value of $$R_3(\Sigma S_i - S_c),$$

the backscatter parameter representing reversepower excluding discrete reflections and after best fit calculation as described above, is calculated for the signals $S_i$ excluding the candidate signal $S_c$ and the result compared with the previously calculated figure $$R_3(\Sigma S_i)$$

for all of the signals $S_1$ to $S_4$. If the result shows a substantial reduction in the backscatter parameter $$R_3(\Sigma S_i - S_c) < R_3(\Sigma S_i) \qquad \text{Equation 3}$$

this is a strong indication that the fault condition is a wavelength specific scattering process and is taken as confirmation that SBS has been induced by the candidate signal $S_c$. If on the other hand there is little or no change in $R_3$, then $S_c$ is concluded not to be the dominant source of scattering.

If $S_c$ is found to be the source of SBS, it is assumed that the reverse power $P(S_c)$ associated with $S_c$ is made up partly of reverse power due to Rayleigh scattering $p^R(S_c)$, in addition to reverse power due to SBS, $P^{SBS}(S_c)$. In order to quantify the SBS contribution $P^{SBS}(S_c)$, the reverse power $P(S_c)$ associated with the candidate signal $S_c$ is estimated by measuring the reverse power components $P(S_i)$ from each of the remaining signals and interpolation on the assumption that the reverse power components follow a wavelength dependence consistent with Rayleigh scattering and given by:

$$P^R(S_i) = k/\lambda^4 \qquad \text{Equation 4}$$

where $P^R(S_i)$ is the reverse power due to Rayleigh scattering for signal $S_i$, k is a constant, and $\lambda$ is the wavelength of signal $S_i$.

A suitable method of conducting such measurement of $P(S_i)$ is to select in turn each of the transmitted signals and to apply dither to the selected signal $S_i$. The reverse power $P(S_i)$ is then correlated with the dither waveform to effect a power measurement which is sensitive only to the selected signal $S_i$. This measurement can be repeated in turn for each signal $S_1$ to $S_4$. Alternatively, mutually orthogonal pseudo-random dither sequences may be applied simultaneously to all of the signals $S_i$ and the correlator provided with spectral templates for each of the dither waveforms to enable the power components $P(S_i)$ of each signal to be individually identified. Such a method is analogous to the method of applying dither to signals disclosed in U.S. Pat. No. 5,513,029.

Figure 7:
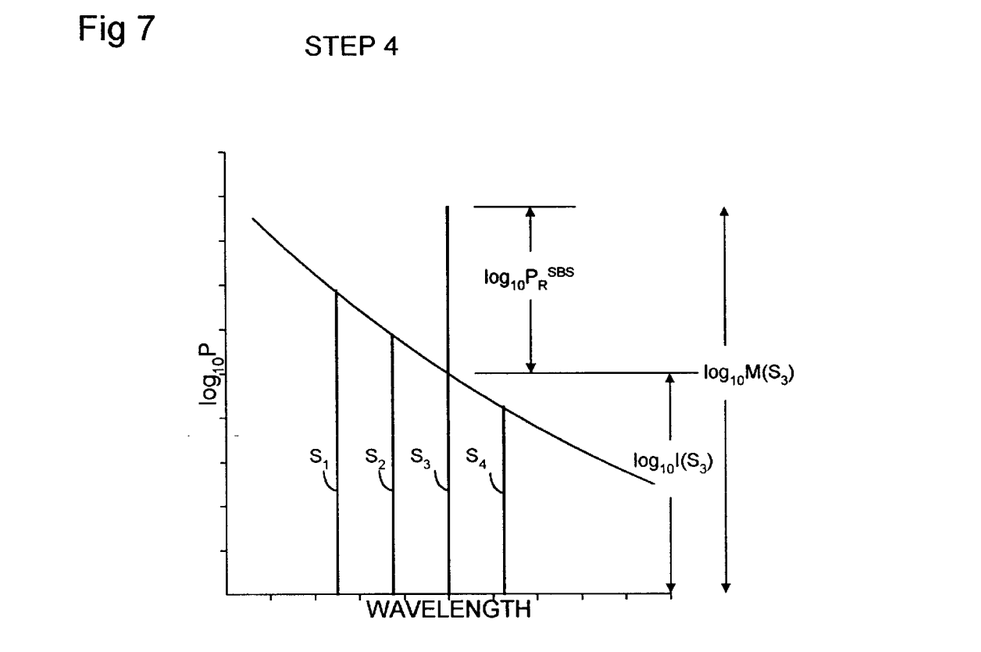
FIG. 7 is a graphical representation of the wavelength dependence of multiplexed signals in the presence of SBS (step 4)

FIG. 7 illustrates graphically the relationship between the reverse power components $P(S_i)$ of the remaining signals which follow the wavelength dependence of Rayleigh scattering, the candidate signal $S_c$ in the example shown being equal to $S_3$ and the SBS contribution to reverse power $P^{SBS}(S_3)$ is seen to be the difference between the measured reverse power component $P(S_3)$ for signal $S_3$ and the interpolated value $I(S_3)$ of reverse power due to Rayleigh scattering of the signal $S_3$.

The processor 3 is thereby able to calculate and output an estimate of the reverse power $P^{SBS}(S_c)$ due to SBS for the candidate signal, thereby enabling the network management system 4 to implement appropriate remedial action which may include generation of an alarm signal. Other actions may include a reduction in the transmitted power for the candidate signal $S_c$ to a level at which SBS is reduced or eliminated. Alternatively, an increased amount of SBS suppression may be applied by the first transmitting and receiving element 5 to the candidate signal. In cases of severe deterioration, it may also be appropriate for the network management system 4 to re-route the data to avoid use of the candidate signal $S_c$ in the waveguide 1 pending further investigation and repair.

As described above, removal of the candidate signal $S_c$ from transmission requires gradual fading out of the candidate signal by controlling the optical power output by the first transmitting and receiving element 5 at the wavelength of the candidate signal. Such gradual fading is necessary to avoid transients in power level occurring in elements of the system, as for example in the case of an erbium doped fibre amplifier handling several signals at different wavelengths where the effect of removing one of the signals would be to increase the amplification applied to the remaining signals. The resulting transient, typically with a time constant of the order of microseconds, typically produces sufficient change in total optical power to result in bit errors. As described in co-pending application U.S. Ser. No. 08/735759 filed Oct. 23rd, 1996 titled "Stable Power Control for Optical Transmission Systems", the contents of which are incorporated herein by reference, the provision of gradual fade-out (or fade-in) of a signal at a particular wavelength in a wavelength division multiplexed signal allows automatic gain control circuits to adjust the pump power of optical amplifiers operating on the remaining signals at other wavelengths in the system, thereby minimising the likelihood of bit errors occurring. The time constant of the gradual fade-in or fade-out is typically of the order of 60 seconds. This fading function may for example be supervised by a local microcontroller at the transmitter, the microcontroller being operable to intercept an instruction to turn off one of the component signals and implement a routine which gradually fades the signal by controlling a gain or attenuation stage within the transmitter module.

A method of adjusting the gain of amplifier elements in the system to maintain the original power levels of the remaining signals when the candidate signal is removed is disclosed in our co-pending application U.S. Ser. No. 08/715662 filed Sep. 18th, 1996, the contents of which are incorporated herein by reference. The disclosed method selects the remaining signal having the strongest power level, the output transmitted for the wavelength of the selected signal being dithered and the amplifier output monitored and correlated with the dither in order to measure the component of optical power corresponding to the selected signal. A control loop then regulates the gain of the optical amplifier to maintain the power of the selected signal at a constant value. Such a method overcomes the problem that an optical amplifier multiplying a multiplexed set of signals of different wavelength will tend to regulate the total power output and will therefore react to removal of one signal by increasing power in the remaining signals.

The above described steps 1 to 4 may be completed without degrading the performance of the system with respect to the remaining signals other than the candidate signal. Furthermore, the above steps may be performed automatically under the control of the processor 3 and the network management system 4 without manual intervention. It is envisaged that for most situations, remedial action may be effected automatically and without the intervention of an operator. There may however be circumstances under which supervisory intervention is necessary, in which case the procedure of the following additional steps may be followed.

Step 5; Measurements Using The Candidate Signal Alone

Figure 8:
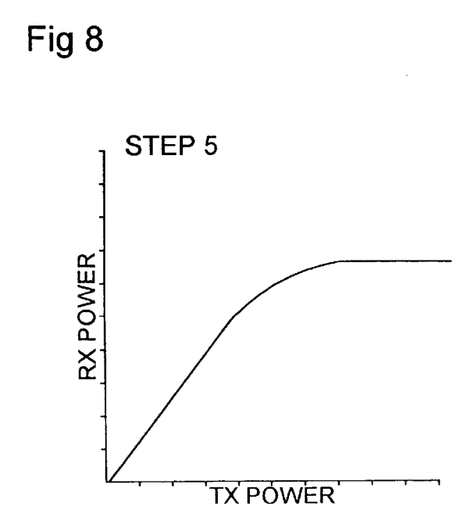
FIG. 8 is a graphical representation of the variation in received power in the presence of SBS (step 5)

Starting from the position that the presence of SBS, or some other induced counterpropagating signal, has been detected for transmission in a particular direction at a particular amplifier and associated with the candidate signal $S_c$, further investigation to provide evidence that the counterpropagating signal is consistent with SBS requires removal of the remaining multiplexed signals in the selected direction so that the received power at the next receiver can be measured as a function of transmitted power. As shown in FIG. 8, the presence of SBS causes the received power to level off in a characteristic manner and at a characteristic power level. Other forms of induced counterpropagating signals, such as Raman scattering, tend to occur at higher power levels than those at which SBS becomes dominant, Raman scattering also being substantially wavelength independent.

To obtain a measurement curve as shown in FIG. 8, each of the remaining signals in the forward direction is faded out gradually to avoid transients (in the manner described above with reference to fading out the candidate signal) and the transmitted power of the candidate signal set to its minimum value, for example −30 dBm. The resulting power received at the next point of measurement is then measured in the selected direction. The transmitted power setting is increased in suitable steps, for example 0.25 dB, and the received power values again measured. In the absence of the remaining signals, the power which can be injected at the candidate signal wavelength can be increased beyond normal limits, thereby enabling any deviation in linearity to be detected at high power levels. The degree of SBS may thereby be measured as the difference in power level between the normal power level of the transmitted candidate signal and the power level at which the onset of SBS is detectable.

If however the above-described procedure of step 5 has been completed without revealing the characteristic non-linear SBS deviation in power characteristic, further investigation is required according to the following step 6.

Figure 9:
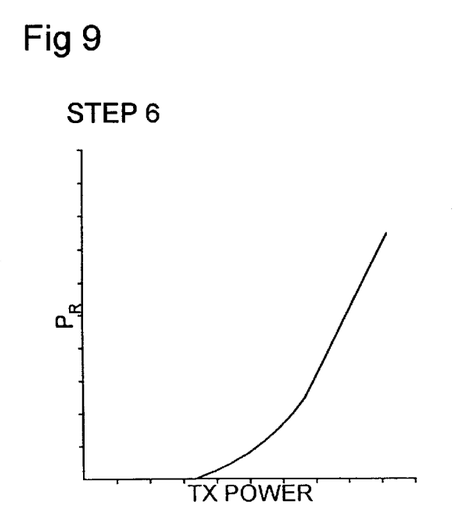
FIG. 9 is a graphical representation of the variation in reverse power with transmitted power (step 6).

Step 6; Measurement of Reverse Power for a Range of Transmitted Power Values Using The Candidate Signal Only The method described above with reference to steps 1, 2 and 3 may be used to measure the reverse power, excluding the effects of discrete reflections, when only the candidate signal is transmitted, after having faded out the remaining signals. The transmitter may then be controlled to adjust the transmitted power through a series of steps allowing the reverse power to be measured at each step and allowing an evaluation of the linearity of a graph of reverse power against transmitted power. A typical graph in the presence of SBS is shown in FIG. 9.

A comparison of the normal power of the candidate signal with the power at which the onset of non-linearity or SBS is observed allows parameters to be extracted to indicate the performance margins of the system. In the example of FIG. 9, the power at which the onset of SBS occurs is greater than the normal power of the candidate signal by a difference which is the margin before the onset of SBS. If the normal power of the candidate signal is greater than the power at onset of SBS, the difference is a measure of the degree of SBS as in the example of FIG. 8.

Results extracted by the above method may be used to control parameters of elements of the system, for example, the amount of margin can be used to adjust the strength of SBS suppression or the peak power setting of the amplifier can be adjusted in order to obtain the required margin before onset of SBS.

The extracted results can be compared to thresholds and alarms or status indicators raised appropriately.

Although the above description refers to SBS and its characteristics, the method may be adapted to detect other forms of non-linearity in the transmission of optical signals, or wavelength dependent reflections, by adjustment of the exponential fit described in step 3.

A system in accordance with the present invention may be programmed to systematically carry out the above described diagnostic measurement steps and take appropriate remedial action. Some of the steps may alternatively be omitted, as for example steps 5 and 6. Steps 1 to 4 may alternatively be simplified, for example by omitting the initial step 1.

I claim:

1. A method of transmitting signals between a plurality of system elements connected by waveguides in an optical communications system, the method comprising the steps of:

(a) monitoring at a bi-directional optical amplifier a transmission via a selected waveguide of a selected outgoing signal in a selected forward direction;

(b) monitoring incoming signals received via said waveguide at the bi-directional optical amplifier in a reverse direction which is opposite to the forward direction;

(c) detecting in the incoming signals a reverse signal constituted by a component of the outgoing signal propagating in the reverse direction;

(d) determining whether the reverse signal has characteristics consistent with the occurrence of an induced counterpropagation process; and (e) controlling the transmission of signals in said system in accordance with the results of said determining step.

2. A method as claimed in claim 1, wherein the determining step (d) determines whether the reverse signal has characteristics consistent with said induced counterpropagating process comprising a scattering process associates with bulk properties of the waveguide.

3. A method as claimed in claim 2, wherein the determining step (d) determines whether the reverse signal has characteristics consistent with the scattering process being stimulated Brillouin scattering.

4. A method as claimed in claim 3, wherein;

the monitoring step (a) comprises monitoring a plurality of further outgoing signals having respective wavelengths different from the wavelength of the selected outgoing signal;

the monitoring step (b) comprises monitoring a corresponding plurality of further incoming signals;

the detecting step (c) comprises detecting a corresponding plurality of further reverse signals; and wherein the determining step (d) comprises an analysis of the respective powers of the reverse signal and the further reverse signals as a function of wavelength.

5. A method as claimed in claim 4, wherein the determining step (d) identifies the further reverse signals as having characteristics consistent with Rayleigh scattering if the respective powers of the further reverse signals have a wavelength dependence substantially of the form:

$$P=k/\lambda^4$$

where P=power, k=constant and $\lambda$=wavelength, and wherein the reverse signal corresponding to the selected output signal is determined to be consistent with stimulated Brillouin scattering if the power of the reverse signal is substantially greater than an interpolated value of power obtained according to said wavelength dependence of the further reverse signals.

6. A method as claimed in claim 5 including the step of quantitively determining a measure of stimulated Brillouin scattering constituting a component of power in the reverse signal by calculating a difference between the interpolated value and the reverse power of the reverse signal.

7. A method as claimed in claim 3 wherein the determine step comprises controlling the transmission of signals via said selected waveguide so as to exclude signals other than the selected outgoing signal, varying the transmitted signal power of the selected outgoing signal, detecting the received signal power of the selected outgoing signal after transmission via the selected waveguide in the forward direction, and determining whether the variation in received power as a function of transmitted power is consistent with the occurrence of stimulated Brillouin scattering.

8. A method as claimed in claim 2, wherein the determining step comprises measurement to obtain power distribution data representative of the power distribution of the reverse signal as a function of delay relative to transmission of the outgoing signal in the forward direction and determining diffuse features of the power distribution to be consistent with the occurrence of a scattering process.

9. A method as claimed in claim 8, wherein the determining step includes the step of identifying discrete features in the power distribution data associated with discrete reflections occurring in any one of the waveguides and the system elements, removing from the power distribution data said discrete features to provide revised power distribution data representative of the reverse signal and performing said determining step on the basis of the revised power distribution data.

10. A method as claimed in claim 9, including the step of applying a best fit calculation to the revised power distribution data to determined best fit coefficients of a predetermined functional relationship representative of the reverse power being associated with a scattering process in the selected waveguide.

11. A method as claimed in claim 10, wherein the functional relationship comprises an exponential decay of power distribution as a function of delay.

12. A method as claimed in claim 10, wherein the determining step comprises a calculation of a back scatter parameter from the results of the best fit calculation, wherein back scatter parameter is representative of a component of power of the reverse signal due to scattering.

13. A method as claimed in claim 12 including the step of comparing the back scatter parameter with a threshold value to determined whether a fault condition exists.

14. A method as claimed in claim 1, wherein steps (a) to (e) are performed under the control of a control system without operator intervention.

15. A method as claimed in claim 1 wherein said determining step (d) comprises quantitively determining a measure of said characteristics in said waveguide and wherein said controlling step (e) comprises controlling the operation of at least one system element in dependence upon the value of said measure.

16. A method as claimed in claim 13 comprising the step of generating an alarm signal in response to the measure of stimulated Brillouin scattering exceeding a threshold value.

17. A method as claimed in claim 15, wherein said at least one system element applies a degree of stimulated Brillouin scattering suppression to signals transmitted thereby, and wherein said controlling step (e) adjusts the degree of suppression in accordance with the results of the determining step (d).

18. A method as claimed in claim 17, wherein said at least one system element applies a minimum degree of stimulated Brillouin scattering suppression required for the determining step (d) to no longer indicate the occurrence of stimulated Brillouin scattering.

19. A method as claimed in claim 15, wherein said at least one system element is controlled so as to adjust the transmitted power in the selected outgoing signal.

20. A method as claimed in claim 15, wherein said at least one element is controlled so as to re-route data traffic in the system to avoid sending data traffic via said selected outgoing signal in said selected waveguide.

21. A method of transmitting signals between a plurality of system elements connected by waveguides in an optical communications system, the method comprising the steps of:
 (a) monitoring at a selected system element a transmission via a selected waveguide of a selected outgoing signal in a selected forward direction;
 (b) monitoring incoming signals received via said waveguide at the selected system element in a reverse direction which is opposite to the forward direction;
 (c) detecting in the incoming signals a reverse signal constituted by a component of the outgoing signal propagated in the reverse direction;
 (d) determining whether the reverse signal has characteristics consistent with the occurrence of an induced counterpropagation process; and
 (e) controlling the transmission of signals in said system in accordance with the results of said determining step;
  wherein the determining step (d) determines whether the reverse signal has characteristics consistent with said induced counterpropagating process being stimulated Brillouin scattering;
  and wherein the determine step comprises controlling the transmission of signals via said selected waveguide so as to exclude signals other than the selected outgoing signal, varying the transmitted signal power of the selected outgoing signal detecting the received signal power of the selected outgoing signal after transmission via the selected waveguide in the forward direction, and determining whether the variation in received power as a function of transmitted power is consistent with the occurrence of stimulated Brillouin scattering.

22. An optical communications system comprising a plurality of system elements connected by waveguides the system comprising:
 (a) monitoring means operable to monitor at a selected system element comprising a bi-directional optical amplifier a transmission via a selected waveguide of a selected outgoing signal in a selected forward direction;
 (b) said monitoring means being further operable to monitor incoming signals received via said waveguide at the selected system element in a reverse direction which is opposite to the forward direction;
 (c) detecting means operable to detect in the incoming signals a reverse signal constituted by a component of the outgoing signal propagated in the reverse direction;
 (d) determining means operable to determine whether the reverse signal has characteristics consistent with the occurrence of an induced counterpropagation process; and
 (e) control means operable to control the transmission of signals in said system in accordance with the results obtained by said determining means.

23. A system as claimed in claim 22, wherein said control means is operable to control said monitoring means, said detecting means and said determining means.

24. A method of transmitting signals between a plurality of system elements connected by waveguides in an optical communications system, the method comprising the steps of:
 (a) monitoring at a selected system element a transmission via a selected waveguide of a selected outgoing signal in a selected forward direction;
 (b) monitoring incoming signals received via said waveguide at the selected system element in a reverse direction which is opposite to the forward direction;
 (c) detecting in the incoming signals a reverse signal constituted by a component of the outgoing signal propagated in the reverse direction;
 (d) determining whether the reverse signal has characteristics consistent with the occurrence of an induced counterpropagation process; and
 (e) controlling the transmission of signals in said system in accordance with the results of said determining step;
  wherein the determining step (d) determines whether the reverse signal has characteristics consistent with said induced counterpropagating process comprising a scattering process associates with bulk properties of the waveguide;
  and wherein the determining step further comprises measurement to obtain power distribution data representative of the power distribution of the reverse signal as a function of delay relative to transmission of the outgoing signal in the forward direction and determining diffuse features of the power distribution to be consistent with the occurrence of a scattering process.

25. A method as claimed in claim 24, wherein the determining step includes the step of identifying discrete features in the power distribution data associated with discrete reflections occurring in any one of the waveguides and the system elements, removing from the power distribution data said discrete features to provide revised power distribution data representative of the reverse signal and performing said determining step on the basis of the revised power distribution data.

26. A method as claimed in claim 25, including the step of applying a best fit calculation to the revised power distribution data to determined best fit coefficients of a predetermined functional relationship representative of the reverse power being associated with a scattering process in the selected waveguide.

27. A method as claimed in claim 26, wherein the functional relationship comprises an exponential decay of power distribution as a function of delay.

28. A method as claimed in claim 26, wherein the determining step comprises a calculation of a back scatter parameter from the results of the best fit calculation, wherein back scatter parameter is representative of a component of power of the reverse signal due to scattering.

29. A method as claimed in claim 28 including the step of comparing the back scatter parameter with a threshold value to determined whether a fault condition exists.

30. A method of transmitting signals between a plurality of system elements connected by waveguides in an optical communications system, the method comprising the steps of:

(a) monitoring at a selected system element a transmission via a selected waveguide of a selected outgoing signal in a selected forward direction;

(b) monitoring incoming signals received via said waveguide at the selected system element in a reverse direction which is opposite to the forward direction;

(c) detecting in the incoming signals a reverse signal constituted by a component of the outgoing signal propagated in the reverse direction;

(d) determining whether the reverse signal has characteristics consistent with the occurrence of an induced counterpropagation process; and (e) controlling the transmission of signals in said system in accordance with the results of said determining step; wherein the determining step (d) determines whether the reverse signal has characteristics consistent with said induced counterpropagating process being stimulated Brillouin scattering;

and wherein the monitoring step (a) comprises monitoring a plurality of further outgoing signals having respective wavelengths different from the wavelength of the selected outgoing signal;

the monitoring step (b) comprises monitoring a corresponding plurality of further incoming signals;

the detecting step (c) comprises detecting a corresponding plurality of further reverse signals; and wherein the determining step (d) comprises an analysis of the respective powers of the reverse signal and the further reverse signals as a function of wavelength.

31. A method as claimed in claim 30, wherein the determining step (d) identifies the further reverse signals as having characteristics consistent with Rayleigh scattering if the respective powers of the further reverse signals have a wavelength dependence substantially of the form:

$$P=k/\lambda^4$$

where P=power, k=constant and $\lambda$=wavelength, and wherein the reverse signal corresponding to the selected output signal is determined to be consistent with stimulated Brillouin scattering if the power of the reverse signal is substantially greater than an interpolated value of power obtained according to said wavelength dependence of the further reverse signals.

32. A method as claimed in claim 31 including the step of quantitively determining a measure of stimulated Brillouin scattering constituting a component of power in the reverse signal by calculating a difference between the interpolated value and the reverse power of the reverse signal.

33. A method of transmitting signals between a plurality of system elements connected by waveguides in an optical communications system, the method comprising the steps of:

(a) monitoring at a selected system element a transmission via a selected waveguide of a selected outgoing signal in a selected forward direction;

(b) monitoring incoming signals received via said waveguide at the selected system element in a reverse direction which is opposite to the forward direction;

(c) detecting in the incoming signals a reverse signal constituted by a component of the outgoing signal propagated in the reverse direction;

(d) determining whether the reverse signal has characteristics consistent with the occurrence of an induced counterpropagation process; and (e) controlling the transmission of signals in said system in accordance with the results of said determining step; wherein said determining step (d) comprises quantitively determining a measure of said characteristics in said waveguide and wherein said controlling step (e) comprises controlling the operation of at least one system element in dependence upon the value of said measure;

and wherein said at least one element is controlled so as to re-route data traffic in the system to avoid sending data traffic via said selected outgoing signal in said selected waveguide.

34. A method of transmitting signals between a plurality of system elements connected by waveguides in an optical communications system, the method comprising the steps of:

(a) monitoring at a selected system element a transmission via a selected waveguide of a selected outgoing signal in a selected forward direction;

(b) monitoring incoming signals received via said waveguide at the selected system element in a reverse direction which is opposite to the forward direction;

(c) detecting in the incoming signals a reverse signal constituted by a component of the outgoing signal propagated in the reverse direction;

(d) determining whether the reverse signal has characteristics consistent with the occurrence of an induced counterpropagation process; and (e) controlling the transmission of signals in said system in accordance with the results of said determining step; wherein said determining step (d) comprises quantitively determining a measure of said characteristics in said waveguide and wherein said controlling step (e) comprises controlling the operation of at least one system element in dependence upon the value of said measure;

and further comprising the step of generating and alarm signal in response to the measure of stimulated Brillouin scattering exceeding a threshold value.

* * * * *